(12) United States Patent
Cinco

(10) Patent No.: US 9,156,386 B2
(45) Date of Patent: Oct. 13, 2015

(54) ARMREST ASSEMBLY

(75) Inventor: Omar Cinco, Farmington Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 309 days.

(21) Appl. No.: 13/329,434

(22) Filed: Dec. 19, 2011

(65) Prior Publication Data

US 2013/0153717 A1    Jun. 20, 2013

(51) Int. Cl.
*B68G 5/00*    (2006.01)
*B60N 2/46*    (2006.01)

(52) U.S. Cl.
CPC .............. *B60N 2/4646* (2013.01); *B60N 2/466* (2013.01)

(58) Field of Classification Search
CPC ...... B60N 2/4646; B60N 2/4626; B60N 2/46; B60N 2/466; B60N 2/4635
USPC .............. 248/118, 298.1, 424; 296/153, 1.09, 296/24.3, 24.34, 37.8, 37.1; 297/115, 297/411.2, 411.21, 411.3, 411.32, 411.35, 297/411.37
See application file for complete search history.

(56) References Cited

U.S. PATENT DOCUMENTS

| | | | |
|---|---|---|---|
| 4,685,729 A | 8/1987 | Heesch et al. | |
| 4,934,750 A | 6/1990 | Eichler et al. | |
| 5,732,944 A | 3/1998 | Mayer | |
| 5,845,965 A | 12/1998 | Heath | |
| 6,007,155 A * | 12/1999 | Hara et al. | 297/463.2 |
| 6,010,193 A * | 1/2000 | Hara et al. | 297/411.35 |
| 6,045,173 A | 4/2000 | Tiesler et al. | |
| 6,250,729 B1 | 6/2001 | Allison et al. | |
| 6,419,314 B1 | 7/2002 | Scheerhorn | |
| 6,719,367 B2 | 4/2004 | Mic et al. | |
| 6,789,831 B2 | 9/2004 | Schmidt et al. | |
| 7,537,287 B2 | 5/2009 | Wieczorek et al. | |
| 7,766,408 B2 | 8/2010 | Lota et al. | |
| 2004/0206858 A1* | 10/2004 | Rockafellow et al. | 248/118 |
| 2006/0279123 A1* | 12/2006 | Bazinski et al. | 297/411.35 |
| 2007/0262632 A1 | 11/2007 | Cody et al. | |
| 2008/0309141 A1* | 12/2008 | Machael et al. | 297/411.36 |
| 2010/0289317 A1 | 11/2010 | Cone | |
| 2013/0153447 A1* | 6/2013 | Cinco | 206/216 |

* cited by examiner

*Primary Examiner* — Christopher Garft
(74) *Attorney, Agent, or Firm* — Ralph E. Smith

(57) ABSTRACT

An armrest assembly may include a base member, an armrest member, and a brake mechanism. The armrest member may be linearly movable relative to the base member between a first position and a second position. The brake mechanism may include first and second brake members. The first brake member may be fixed relative to the base member. The second brake member may be movable with the armrest member relative to the base member and may be movable relative to the first brake member between an engaged position restricting relative movement between the armrest member and the base member and a disengaged position allowing relative movement between the armrest member and the base member. The first and second brake members may be engageable with each other at any of an infinite number of positions between the first and second positions.

18 Claims, 4 Drawing Sheets

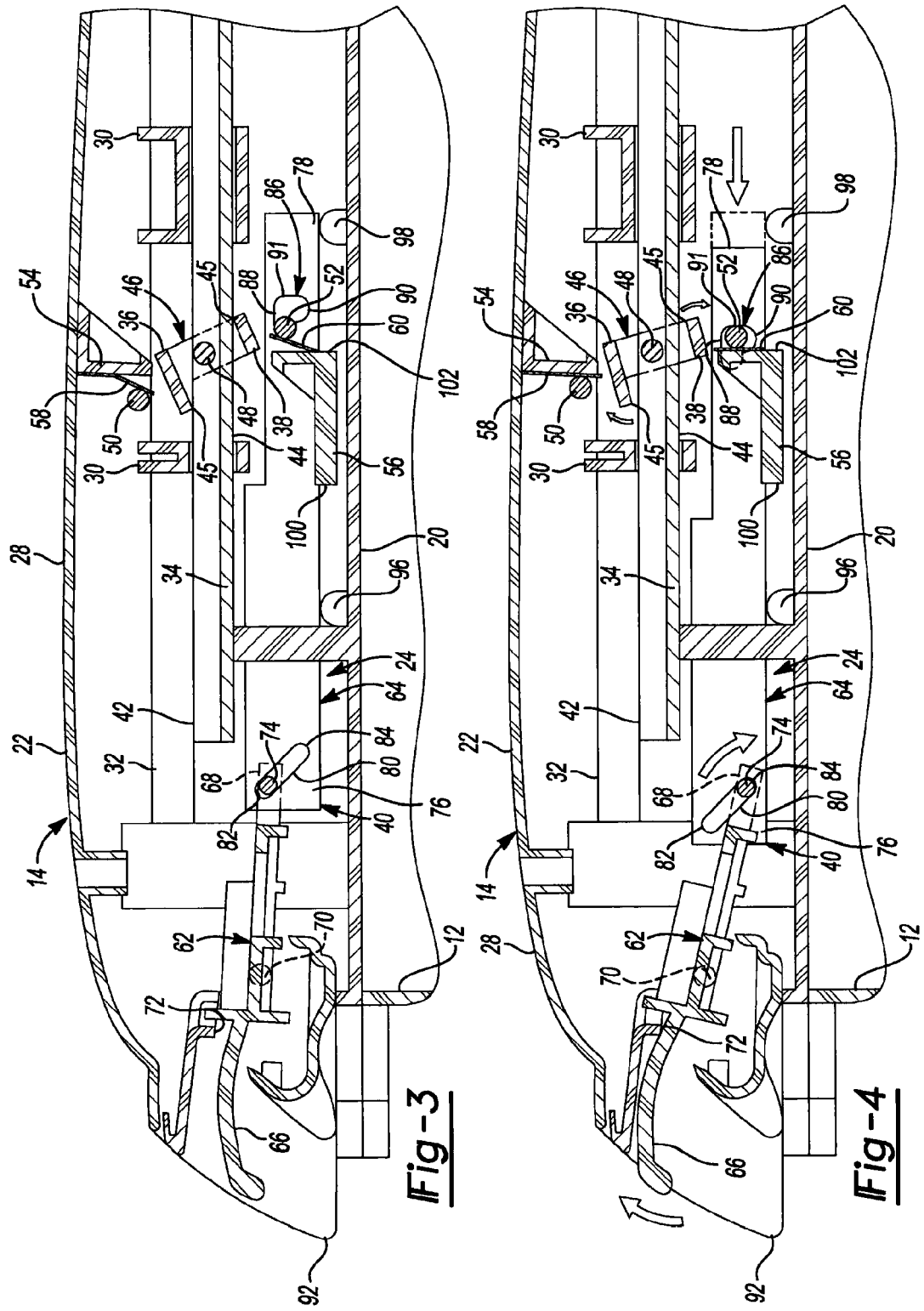

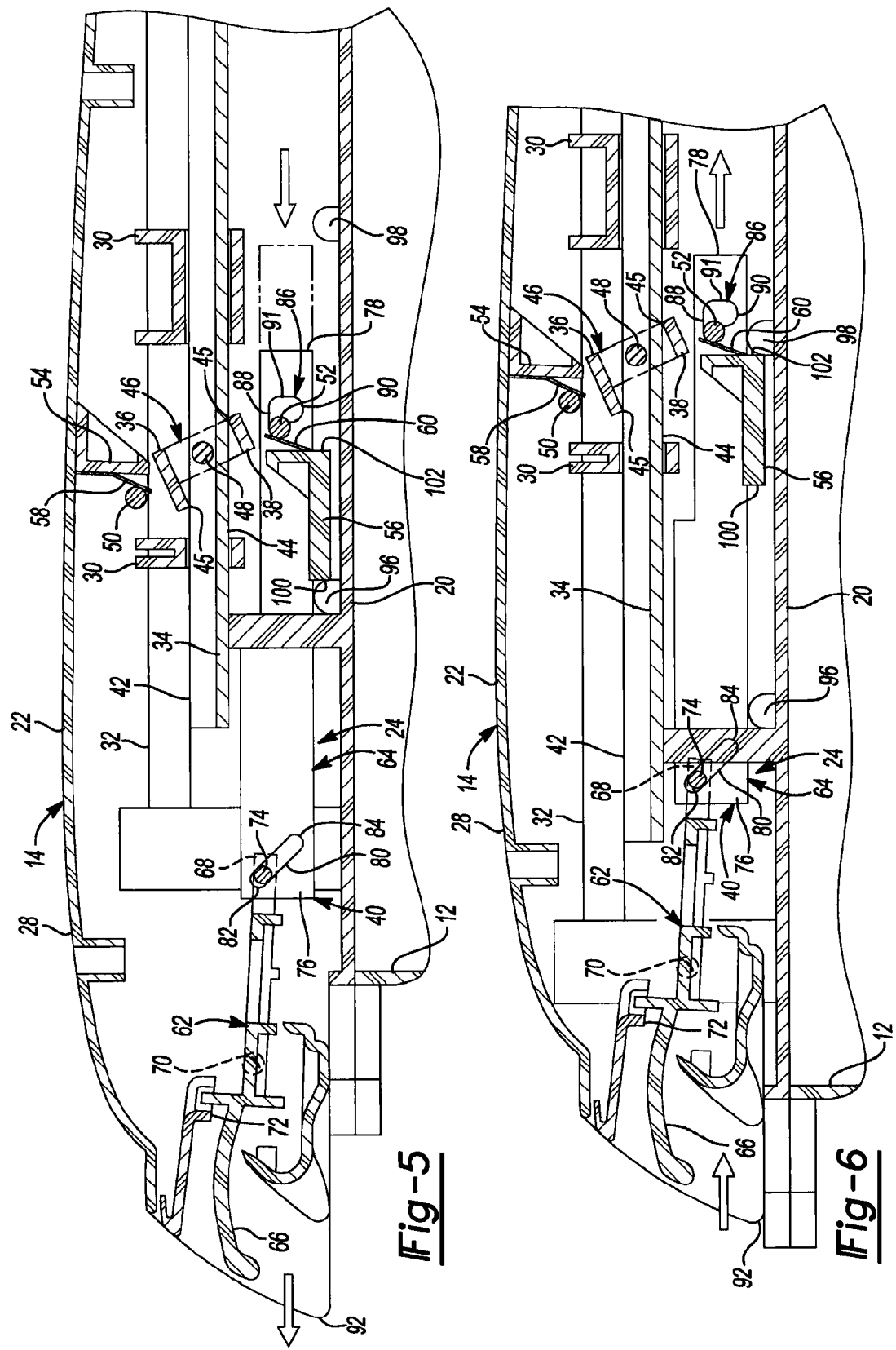

ARMREST ASSEMBLY

FIELD

The present disclosure relates to an armrest, and more particularly, to a movable armrest with a brake mechanism.

BACKGROUND

Many vehicles include a center-console having a storage compartment and an armrest. The armrest may at least partially cover the storage compartment to conceal its contents. Some vehicles include a stand-alone armrest that is not associated with a console. In either configuration, the armrest may provide a comfortable surface upon which an occupant of the vehicle may rest his or her arm. The armrest may include a cushioning material to improve the comfort of the armrest and the overall comfort of the interior of the vehicle.

SUMMARY

The present disclosure provides an armrest assembly that may include a base member, an armrest member, and a brake mechanism. The armrest member may be linearly movable relative to the base member between a first position and a second position. The brake mechanism may include first and second brake members. The first brake member may be fixed relative to the base member. The second brake member may be movable with the armrest member relative to the base member and may be movable relative to the first brake member between an engaged position restricting relative movement between the armrest member and the base member and a disengaged position allowing relative movement between the armrest member and the base member. The first and second brake members may be engageable with each other at any of an infinite number of positions between the first and second positions.

In some embodiments, the first brake member may include substantially flat first and second engagement surfaces. The second brake member may include first and second rotating plates contacting the first and second engagement surfaces, respectively, in the engaged position. In some embodiments, the first and second rotating plates may be substantially parallel to each other and may be angled relative to the first and second engagement surfaces in the engaged position. In some embodiments, the first and second rotating plates may be rotatable about a single axis of rotation.

In some embodiments, the second brake member may rotate relative to the first brake member between the engaged and disengaged positions in response to actuation of a linkage. The linkage may include a first and second members. The first member may be rotatable relative to the armrest member and the base member. The second member may be slidably engaged with the first member and slidably engaged with the second brake member and may be linearly movable relative to the armrest member and the base member. The first member may include a latch member that extends through an opening defined by at least one of the armrest member and the base member. The latch member may be accessible to a vehicle occupant.

In some embodiments, the brake mechanism may include a biasing member biasing the second brake member toward the engaged position.

In some embodiments, the first brake member may include an engagement surface that the second brake member contacts in the engaged position. The engagement surface may be substantially flat and continuous between a first portion corresponding to the first position of the armrest member relative to the base member and a second portion corresponding to the second position of the armrest member relative to the base member.

In some embodiments, the armrest assembly may include a hinge connected to at least one of the armrest member and the base member and may allow the armrest member to rotate relative to a storage compartment.

The present disclosure also provides an armrest assembly that may include a base member, an armrest member, and a brake mechanism. The armrest member may be movable in a linear path relative to the base member between a first position and a second position. The brake mechanism may include first and second brake members. The first brake member may be fixed relative to the base member. The second brake member may be movable relative to the first brake member between an engaged position restricting relative movement between the armrest member and the base member and a disengaged position allowing relative movement between the armrest member and the base member. The first brake member may include an engagement surface that the second brake member contacts in the engaged position. The engagement surface may be substantially flat and continuous at the first and second portions and between the first and second portions. The first portion may correspond to the first position of the armrest member relative to the base member. The second portion may correspond to the second position of the armrest member relative to the base member.

In some embodiments, the first and second brake member may be configured to selectively restrict relative movement between the base member and the armrest member at any of an infinite number of positions between the first and second positions.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 3 is a cross-sectional view of the armrest assembly with the brake mechanism in an engaged position;

FIG. 4 is a cross-sectional view of the armrest assembly with the brake mechanism in a disengaged position;

FIG. 5 is a cross-sectional view of an armrest member in a forward position and the brake mechanism in the engaged position; and FIG. 6 is a cross-sectional view of the armrest member in a rearward position and the brake mechanism in the engaged position.

DETAILED DESCRIPTION

Figure 1:
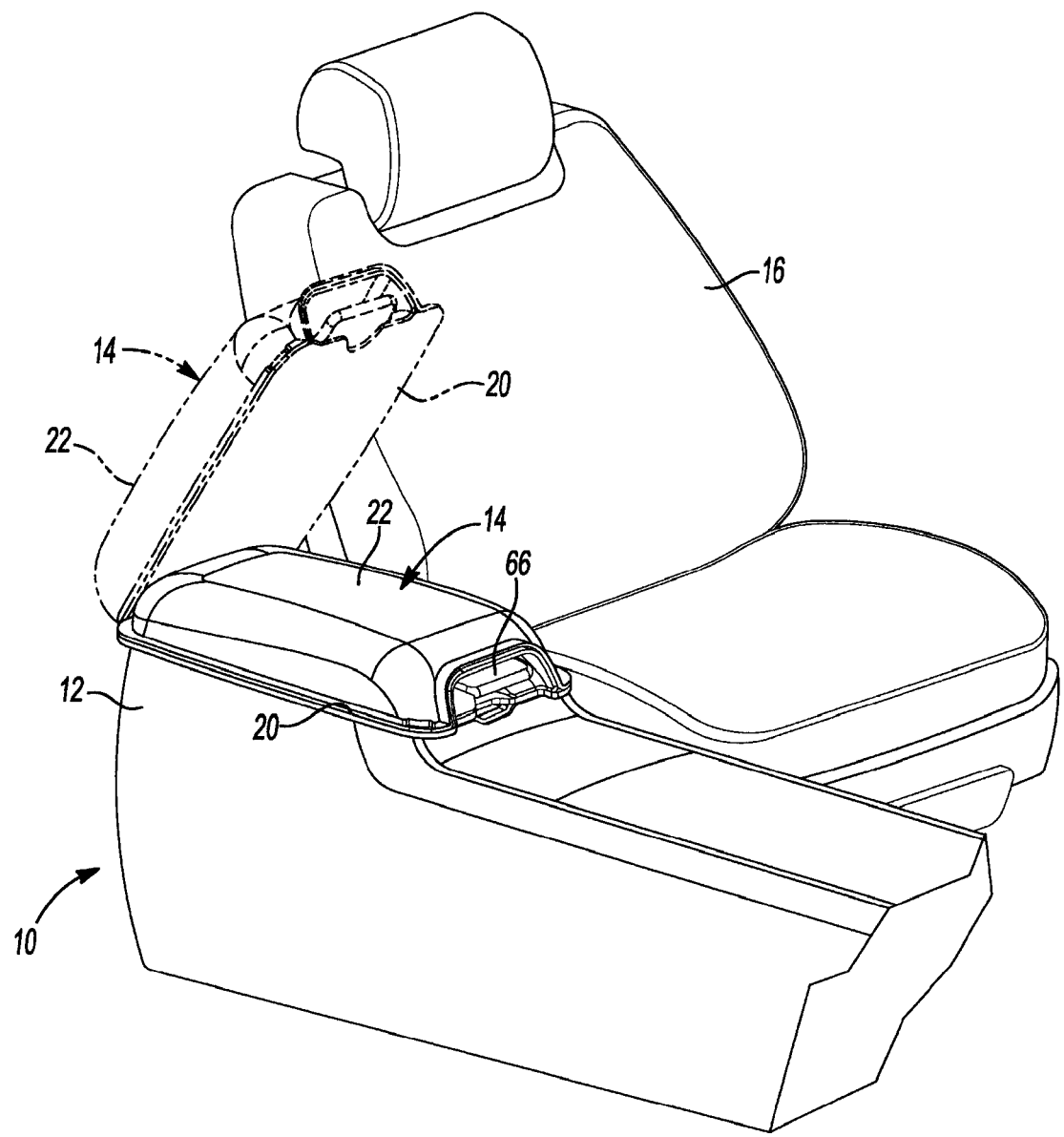
FIG. 1 is a perspective view of a console having an armrest assembly according to the principles of the present disclosure.
Figure 2:
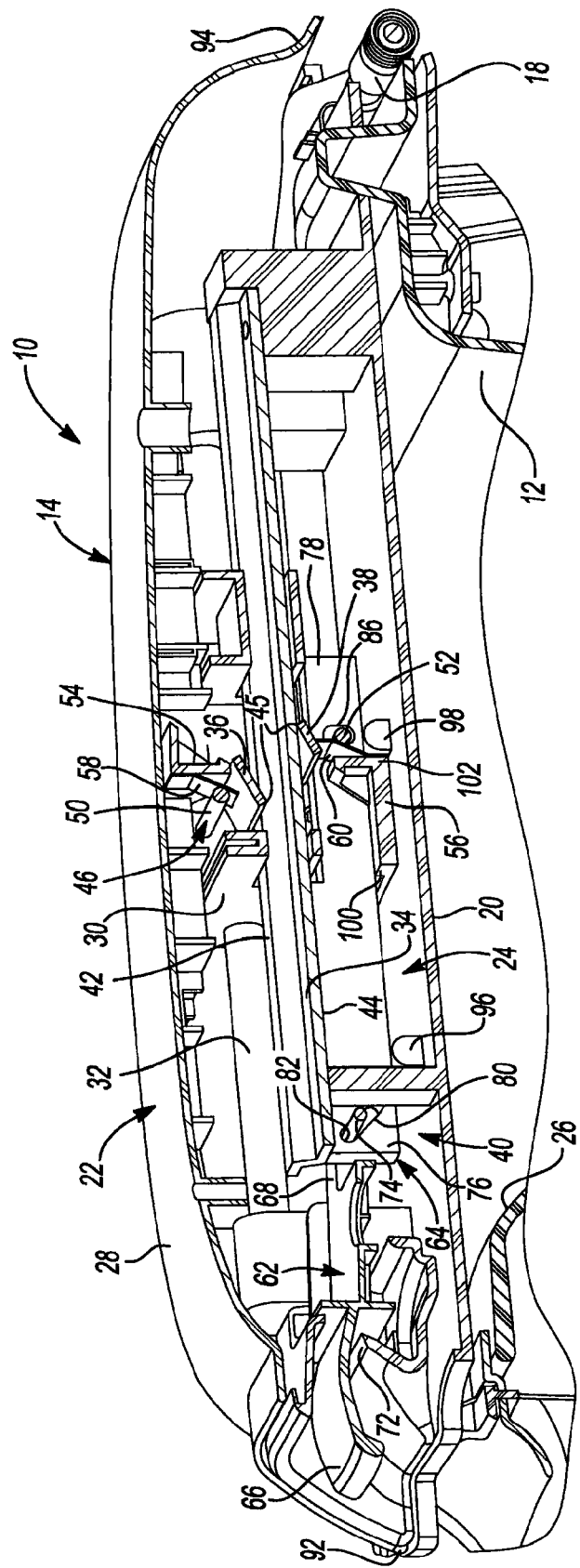
FIG. 2 is a cross-sectional perspective view of the armrest assembly and a brake mechanism of the armrest assembly.

In an exemplary embodiment and with reference to FIGS. 1-6, a console 10 is provided that may include a storage compartment 12 and an armrest assembly 14. The console 10 may be disposed adjacent one or more seats 16 in an interior of a vehicle, for example. In some embodiments, the console 10 may be disposed between a driver's seat and a front passenger's seat (not shown). An occupant of the vehicle may store his or her personal belongings and/or other items in the storage compartment 12 and may rest his or her arm on the armrest assembly 14, for example. The armrest assembly 14 may be mounted to the storage compartment 12 and may be pivotable about a hinge 18 relative to the storage compartment 12 between a closed position (shown in solid lines in FIG. 1) restricting access to the storage compartment 12 and an open position (shown in phantom lines in FIG. 1) allowing access to the storage compartment 12. As will be subsequently described, at least a portion of the armrest assembly 14 may be selectively linearly movable relative to the storage compartment 12 between a full-forward position (FIG. 5) and a full-rearward position (FIG. 6) and may be locked or retained in either the full-forward position or the full-rearward position or at any of an infinite number of positions therebetween.

The armrest assembly 14 may include a base member 20, an armrest member 22, and a brake mechanism 24. The base member 20 may be connected to the storage compartment 12 by the hinge 18 and may extend across an opening 26 of the storage compartment 12 when the armrest assembly 14 is in the closed position. The armrest member 22 may be mounted to the base member 20 and may be movable relative thereto between the full-forward position and the full-rearward position. The armrest member 22 may include a generally hollow shell 28 that cooperates with the base member 20 to house and substantially enclose the brake mechanism 24. In some embodiments, an exterior of the shell 28 may include a padding material and/or an upholstery material to improve the comfort and aesthetics of the armrest assembly 14.

One or more slide members 30 may be fixed to an interior of the shell 28 and may slidably engage a pair of parallel rails 32 (only one of which is shown in FIGS. 2-6) that are fixed relative to the base member 20. The slide members 30 and thus, the armrest member 22, are slidable along the rails 32 between the full-forward and full-rearward positions.

The brake mechanism 24 may include an elongated brake plate 34, first and second brake members 36, 38, and a linkage 40. As will be subsequently described, a user may actuate the linkage 40 to move the first and second brake members 36, 38 relative to the brake plate 34 between an engaged position (FIG. 3) restricting relative movement between the armrest member 22 and the base member 20 and a disengaged position (FIG. 4) allowing relative movement between the armrest member 22 and the base member 20. The brake plate 34 may be fixedly mounted to the base member 20 and may include first and second brake surfaces 42, 44. The first and second brake surfaces 42, 44 may be substantially planar, continuous surfaces. When the brake mechanism 24 is in the engaged position, leading edges 45 of the first and second brake members 36, 38 may engage the first and second brake surfaces 42, 44, respectively.

The first and second brake members 36, 38 may be mounted to a rotating brake-wheel 46 that may include an axle 48, a first peg 50 and a second peg 52. The axle 48 may be rotatably supported by the armrest member 22 to allow rotation of the first and second brake members 36, 38 and the first and second pegs 50, 52 about the axle 48 relative to the armrest member 22 and the brake plate 34 between the engaged and disengaged positions (compare FIGS. 3 and 4).

First and second brace members 54, 56 may be fixed relative to the armrest member 22. First and second biasing members 58, 60 may extend from the first and second brace members 54, 56, respectively. The first and second biasing members 58, 60 may include leaf springs or coil springs, for example, and/or any other resiliently compressible members. The first and second biasing members 58, 60 may contact the first and second pegs 50, 52, respectively, and bias the first and second pegs 50, 52 away from the first and second brace members 54, 56 (i.e., the first and second biasing members 58, 60 may bias the brake-wheel 46 toward the engaged position).

The linkage 40 may include a latch member 62 and a link member 64. The latch member 62 may include a first end 66 and a second end 68 and may be supported for rotation relative to the armrest member 22 about a pivot 70 attached to the armrest member 22. The first end 66 may extend through an opening 72 in the armrest member 22. The second end 68 may include a pin 74 extending therefrom.

The link member 64 may include first and second ends 76, 78 and may connect the latch member 62 to the brake-wheel 46 such that rotation of the latch member 62 about the pivot 70 causes corresponding movement of the brake-wheel 46. The first end 76 of the link member 64 may include a first slot 80 that is angled relative to the base member 20. The pin 74 extending from the second end 68 of the latch member 62 may be received in the first slot 80 and may be slidable therein between first and second ends 82, 84 of the first slot 80. The second end 78 of the link member 64 may include a generally L-shaped second slot 86 having first and second portions 88, 90 and a rear wall 91. The second peg 52 of the brake-wheel 46 may be received in the second slot 86 and may be slidable therein through the first and second portions 88, 90.

With continued reference to FIGS. 1-6, operation of the armrest assembly 14 will be described in detail. As described above, the armrest assembly 14 may be pivotable about the hinge 18 relative to the storage compartment 12 between open and closed positions (FIG. 1). The armrest member 22 is selectively linearly movable relative to the storage compartment 12 and the base member 20 between the full-forward position (FIG. 5) and the full-rearward position (FIG. 6).

A user may move the armrest member 22 relative to the storage compartment 12 and the base member 20 by applying an upward force to the first end 66 of the latch member 62 to rotate the latch member 62 to the position shown in FIG. 4 which causes the brake-wheel 46 to rotate into the disengaged position. With the brake-wheel 46 in the disengaged position (i.e., the first and second brake members 36, 38 disengaged from the brake plate 34), the user may then apply a forward or backward force to the armrest member 22 to slide the armrest member 22 between the full-forward position (FIG. 5) and the full-rearward position (FIG. 6). Once the armrest member 22 is moved to a desired position, the user may release the latch member 62 to allow the first and second biasing members 58, 60 to bias the brake-wheel 46 (and thus, the first and second brake members 36, 38) back into the engaged position to "lock" the armrest member 22 in place (i.e., restrict further movement of the armrest member 22 relative to the base member 20). The armrest member 22 can be locked in place at any of an infinite number of positions including and between the full-forward position (FIG. 5) and the full-rearward position (FIG. 6). In this manner, positioning of the armrest member 22 relative to the base member 20 is not limited to one of a plurality of discrete positions between a full-forward position and a full-rearward position.

When the user moves the first end 66 of the latch member 62 upward as described above, the second end 68 of the latch member 62 may be moving downward such that the pin 74 slides downward in the angled first slot 80 in the link member 64. Movement of the pin 74 through the first slot 80 from the first end 82 to the second end 84 causes the link member 64 to move relative to the armrest member 22 and the base member 20 in a substantially linear direction toward a front end 92 of the armrest assembly 14. This linear movement of the link member 64 may result in relative movement between the second slot 86 of the link member 64 and the second peg 52 of the brake-wheel 46 such that rear wall 91 of the second slot 86 may contact the second peg 52 and force the second peg 52 to overcome the biasing force of the first and second biasing members 58, 60 and move relative to the brake plate 34 in a clockwise direction (relative to the views shown in FIGS. 3-6), thereby moving the brake-wheel 46 into the disengaged position, as shown in FIG. 4.

As described above, when the brake-wheel 46 is in the disengaged position, the first and second brake members 36, 38 are spaced apart from the first and second brake surfaces 42, 44. This allows the armrest member 22 to freely slide forward and backward to any of an infinite number of positions including and between the full-forward and full-rearward positions.

In some embodiments, the base member 20 may include a forward stop member 96 and a rearward stop member 98 that define the full-forward and full-rearward positions, respectively. That is, in the full-forward position, a first end 100 of the second brace member 56 may abut the forward stop member 96 (as shown in FIG. 5) and prevent further forward movement of the armrest member 22 relative to the base member 20. In the full-forward position a second end 102 of the second brace member 56 may abut the rearward stop member 98 (as shown in FIG. 6) and prevent further rearward movement of the armrest member 22 relative to the base member 20.

As described above, the user may lock the armrest member 22 relative to the base member 20 (i.e., restrict relative movement between the armrest member 22 relative to the base member 20) by releasing the upward force on the first end 66 of the latch member 62. When the latch member 62 is released, the first and second biasing members 58, 60 may urge the first and second pegs 50, 52, respectively, in a counterclockwise direction (relative to the views shown in FIGS. 3-6) to move the brake-wheel 46 back to the engaged position so that the first and second brake members 36, 38 may engage the first and second brake surfaces 42, 44, respectively. Movement of the brake-wheel 46 into the engaged position causes the second peg 52 to move the link member 64 in a substantially linear direction toward an aft end 94 of the armrest assembly 14. Such movement of the link member 64 causes the pin 74 to move toward the first end 82 of the first slot 80 and rotates the latch member 62 into the position shown in FIG. 3. In some embodiments, a torsion spring could be disposed around the pivot 70 of the latch member 62 to provide an additional force to bias the brake mechanism 24 toward the engaged position.

It will be appreciated that in other embodiments, the structure and function of the brake mechanism 24 could vary from the structure and function described above. Furthermore, while the armrest assembly 14 is described above and shown in the figures as being mounted to the console 10 having the storage compartment 12, in other embodiments, the armrest assembly 14 could be mounted to any other structure in an interior of a vehicle.

What is claimed is:
1. An armrest assembly comprising:
a base member;
an armrest member linearly movable relative to the base member between a first position and a second position; and a brake mechanism including first and second brake members, the first brake member being fixed relative to the base member, the second brake member being movable with the armrest member relative to the base member and movable relative to the first brake member between an engaged position preventing relative movement between the armrest member and the base member and a disengaged position allowing relative movement between the armrest member and the base member, the second brake member being movable into the engaged position at any of an infinite number of positions between the first and second positions, the second brake member being movable to the disengaged position in response to an application of a force by a user, the brake mechanism being configured so that a release of the force moves the second brake member from the disengaged position to the engaged position and prevents relative movement between the armrest member and the base member, wherein the first brake member includes first and second engagement surfaces that are flat and parallel to each other and face opposite directions, the second brake member including first and second rotating plates that simultaneously contact the first and second engagement surfaces, respectively, when the second brake member is in the engaged position, the first rotating plate being rotationally fixed to the second rotating plate for simultaneous rotation.

2. The armrest assembly of claim 1, wherein the first and second rotating plates are substantially parallel to each other and angled relative to the first and second engagement surfaces in the engaged position.

3. The armrest assembly of claim 1, wherein the first and second plates are rotatable about a single axis of rotation.

4. The armrest assembly of claim 1, wherein the second brake member rotates relative to the first brake member between the engaged and disengaged positions in response to actuation of a linkage.

5. The armrest assembly of claim 4, wherein the linkage includes first and second members, the first member is rotatable relative to the armrest member and the base member, the second member is slidably engaged with the first member and slidably engaged with the second brake member and is linearly movable relative to the armrest member and the base member.

6. The armrest assembly of claim 5, wherein the first member includes a latch member that extends through an opening defined by at least one of the armrest member and the base member, the latch member being accessible to a vehicle occupant.

7. The armrest assembly of claim 1, wherein the brake mechanism includes a biasing member biasing the second brake member toward the engaged position.

8. The armrest assembly of claim 1, wherein the first engagement surface includes a first portion contacting the first rotating plate at the first position of the armrest member relative to the base member and a second portion contacting the first rotating plate at the second position of the armrest member relative to the base member, and wherein the first engagement surface is a flat and continuous surface at the first and second portions and between the first and second portions.

9. The armrest assembly of claim 1, further comprising a hinge connected to at least one of the armrest member and the base member and allowing the armrest member to rotate relative to a storage compartment.

10. An armrest assembly comprising:

a base member;

an armrest member movable in a linear path relative to the base member between a first position and a second position; and a brake mechanism including first and second brake members, the first brake member being fixed relative to the base member, the second brake member movable relative to the first brake member between an engaged position preventing relative movement between the armrest member and the base member and a disengaged position allowing relative movement between the armrest member and the base member, the first brake member including an engagement surface that the second brake member contacts in the engaged position, the engagement surface including first and second portions, the engagement surface is a single flat and continuous surface at the first and second portions and between the first and second portions, the first portion engaging the second brake member when the armrest is in the first position, the second portion engaging the second brake member when the armrest is in the second position, the second brake member being movable to the disengaged position in response to an application of a force by a user, the brake mechanism being configured so that a release of the force moves the second brake member from the disengaged position to the engaged position and prevents relative movement between the armrest member and the base member;

wherein the first brake member includes a plurality of engagement surfaces, and the second brake member includes first and second rotating plates contacting respective engagement surfaces in the engaged position, the first rotating plate being rotationally fixed to the second rotating plate for simultaneous rotation.

11. The armrest assembly of claim 10, wherein the first and second rotating plates are substantially parallel to each other and angled relative to the engagement surfaces in the engaged position.

12. The armrest assembly of claim 10, wherein the first and second rotating plates are rotatable about a single axis of rotation.

13. The armrest assembly of claim 10, wherein the second brake member rotates relative to the first brake member between the engaged and disengaged positions in response to actuation of a linkage.

14. The armrest assembly of claim 13, wherein the linkage includes a first and second members, the first member is rotatable relative to the armrest member and the base member, the second member is slidably engaged with the first member and slidably engaged with the second brake member and is linearly movable relative to the armrest member and the base member.

15. The armrest assembly of claim 14, wherein the first member includes a latch member that extends through an opening defined by at least one of the armrest member and the base member, the latch member being accessible to a vehicle occupant.

16. The armrest assembly of claim 10, wherein the brake mechanism includes a biasing member biasing the second brake member toward the engaged position.

17. The armrest assembly of claim 10, further comprising a hinge connected to at least one of the armrest member and the base member and allowing the armrest member to rotate relative to a storage compartment.

18. The armrest assembly of claim 10, wherein the first and second brake members are configured to selectively prevent relative movement between the base member and the armrest member at any of an infinite number of positions between the first and second positions.

* * * * *